United States Patent [19]
DeGroot

[11] 3,872,938
[45] Mar. 25, 1975

[54] CONVERTIBLE GROUND AND SNOW TRAVELING VEHICLE

[76] Inventor: Charles F. DeGroot, Rt. 1, Box 55, Fall City, Wash. 98024

[22] Filed: Dec. 26, 1973

[21] Appl. No.: 427,905

[52] U.S. Cl. .............................. 180/5 R, 180/9.24 R
[51] Int. Cl. ............................................. B62m 27/02
[58] Field of Search.......... 180/5 R, 9.24, 9.26, 9.30

[56] References Cited
UNITED STATES PATENTS

| | | | |
|---|---|---|---|
| 1,068,883 | 7/1913 | Frank | 180/9.24 R |
| 3,158,220 | 11/1964 | Griffith | 180/9.24 R |
| 3,596,727 | 8/1971 | Graham | 180/5 R |

*Primary Examiner*—Philip Goodman
*Attorney, Agent, or Firm*—Graybeal, Barnard, Uhlir & Hughes

[57] ABSTRACT

An apparatus by which a conventional motorcycle can be converted to a snow traveling vehicle. There is a forward steering ski assembly mounted to the existing motorcycle steering apparatus, so as to be operated by turning the handle-bars of the motorcycle in a conventional manner. There is also a rear support and drive assembly which comprises an auxiliary frame fixedly mounted to and extending rearwardly from the main frame of the motorcycle. A drive belt having cleats to engage the snow over which the vehicle is traveling is mounted to the vehicle by first removing the rear tire and placing the drive belt around the rim of the rear wheel, with the other end of the drive belt being looped around a rear idler wheel mounted at the rear of the auxiliary frame. Thus the drive belt tracks to and is powered directly from the existing rear drive wheel of the motorcycle. A pair of optional outrigger skis are mounted on opposite sides of the auxiliary frame to facilitate travel through deep soft snow.

13 Claims, 6 Drawing Figures

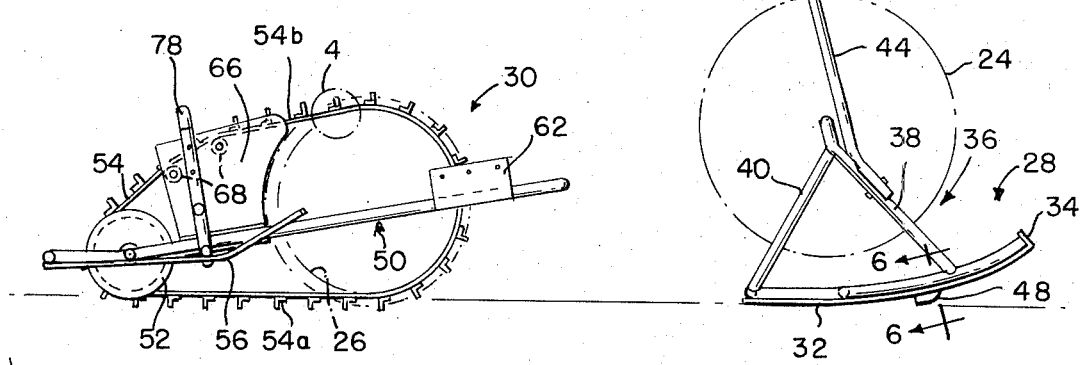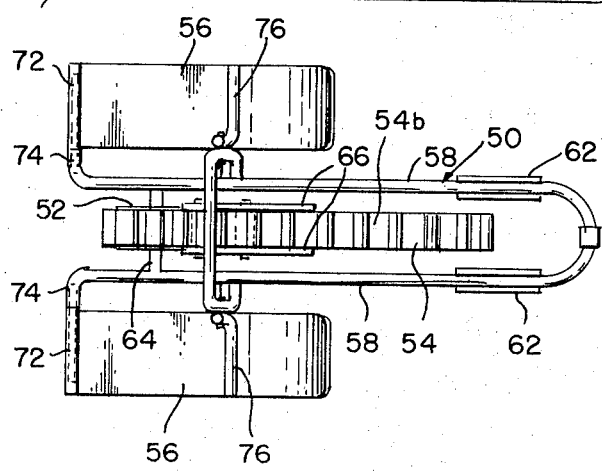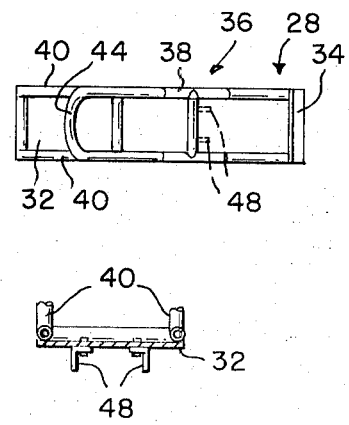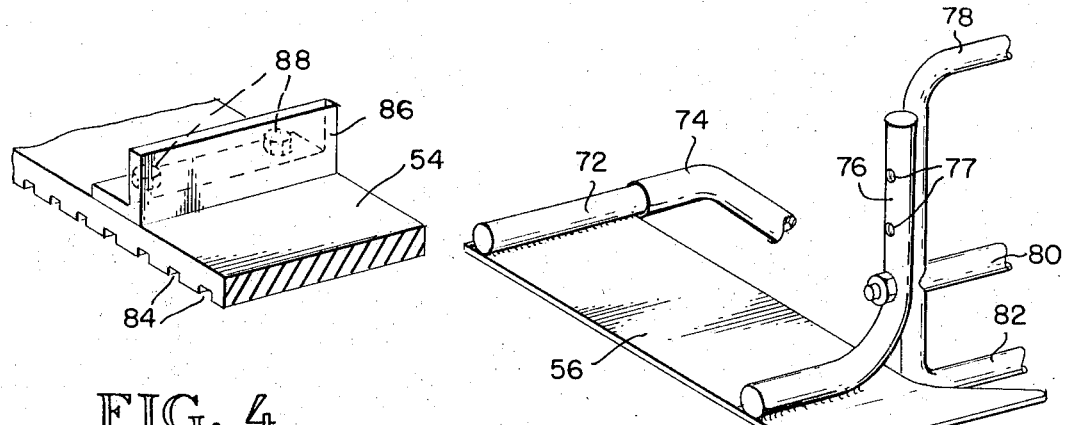

CONVERTIBLE GROUND AND SNOW TRAVELING VEHICLE

BACKGROUND OF THE INVENTION

1. Field of the Invention

The present invention relates to an apparatus by which a conventional vehicle, such as a motorcycle, can be converted to a snow traveling vehicle.

2. Description of the Prior Art

There exists in the prior art various mechanisms which permit a two wheeled vehicle, such as a motorcycle, to be converted for travel over a snow surface. Generally, these comprise a forward ski assembly by which the vehicle is supported at its forward end and steered through the snow, and also a rear support and drive assembly. In the prior art, this drive assembly usually comprises a separate power track unit which is mounted as a new drive unit to the vehicle. Examples of various prior art units are shown in the following patents: Putrow, U.S. Pat. No. 524,349; Lakso, U.S. Pat. No. 1,217,191; Wells, U.S. Pat. No. 1,250,739; Reichling, U.S. Pat. No. 1,547,822; Aeder et al., U.S. Pat. No. 3,252,533; Hansen, U.S. Pat. No. 3,318,402; Pederson, U.S. Pat. No. 3,336,994; Wachholz, U.S. Pat. No. 3,412,820; Humphrey, U.S. Pat. No. 3,412,821; Pederson, U.S. Pat. No. 3,439,763; Jones et al., U.S. Pat. No. 3,545,559; Donelson, Jr., U.S. Pat. No. 3,592,279; Henricks, U.S. Pat. No. 3,630,301; and Pushnig et al., U.S. Pat. No. 3,650,342.

Quite often such prior art apparatus by which the conversion to snow travel can be accomplished is overly complex and in some instances involves a substantial conversion of the existing vehicle. In view of this, it is an object of the present invention to provide an apparatus by which an existing vehicle, such as a conventional motorcycle, can be easily and simply converted to an effective snow traveling vehicle and reconverted for conventional ground travel.

SUMMARY OF THE INVENTION

The present invention is particularly adapted to be used in combination with a ground traveling vehicle, such as a conventional motorcycle. The present invention comprises a front ski unit adapted to be mounted to the existing front wheel assembly of the vehicle so as to be steerable therewith and provide front end support, and also a rear support and drive assembly. The rear support and drive assembly comprises an auxiliary frame mounted to a main frame of the vehicle and cantilevered rearwardly therefrom. There is a rear idler wheel mounted to the auxiliary frame at a level proximate the snow surface over which the vehicle is to travel. An endless snow engaging belt is mounted to the existing rear wheel of the vehicle and also to the idler wheel. This is accomplished by removing the existing tire from the rim of the existing rear drive wheel and placing the drive belt in the peripheral groove of the rear wheel rim.

More particularly, the front ski member is mounted by means of an associated frame that connects to the existing front wheel axle of the vehicle. There is a positioning arm rigidly connected to the front ski frame and upstanding therefrom which engages the forward portion of the vehicle steering assembly to prevent forward and upward rotation of the forward ski beyond a desired travel position.

The auxiliary frame of the rear drive assembly is mounted for forward and rearward adjustment to accomplish proper tensioning of the drive belt. This auxiliary frame further comprises a pair of upstanding laterally spaced plates, which carry a pair of tensioning rollers over which the upper run of the drive belt rides, with the drive belt being positioned between these two plates. The outrigger skis are also mounted to the auxiliary frame in a manner to permit vertical adjustment.

Other features of the present invention will become apparent from the following detailed description.

BRIEF DESCRIPTION OF THE DRAWINGS

FIG. 2 is a side elevational view of the forward and rear assemblies of the present invention in the position in which these are mounted to a conventional motorcycle;

FIG. 3 is a top plan view of the two assemblies of FIG. 2;

FIG. 4 is a detail of the drive belt of the present invention, circled at 4 in FIG. 2;

FIG. 5 is an isometric view of one of the outrigger skis of the rear assembly of the present invention; and FIG. 6 is a sectional view taken along line 6—6 of FIG. 3.

DESCRIPTION OF THE PREFERRED EMBODIMENT

Figure 1:
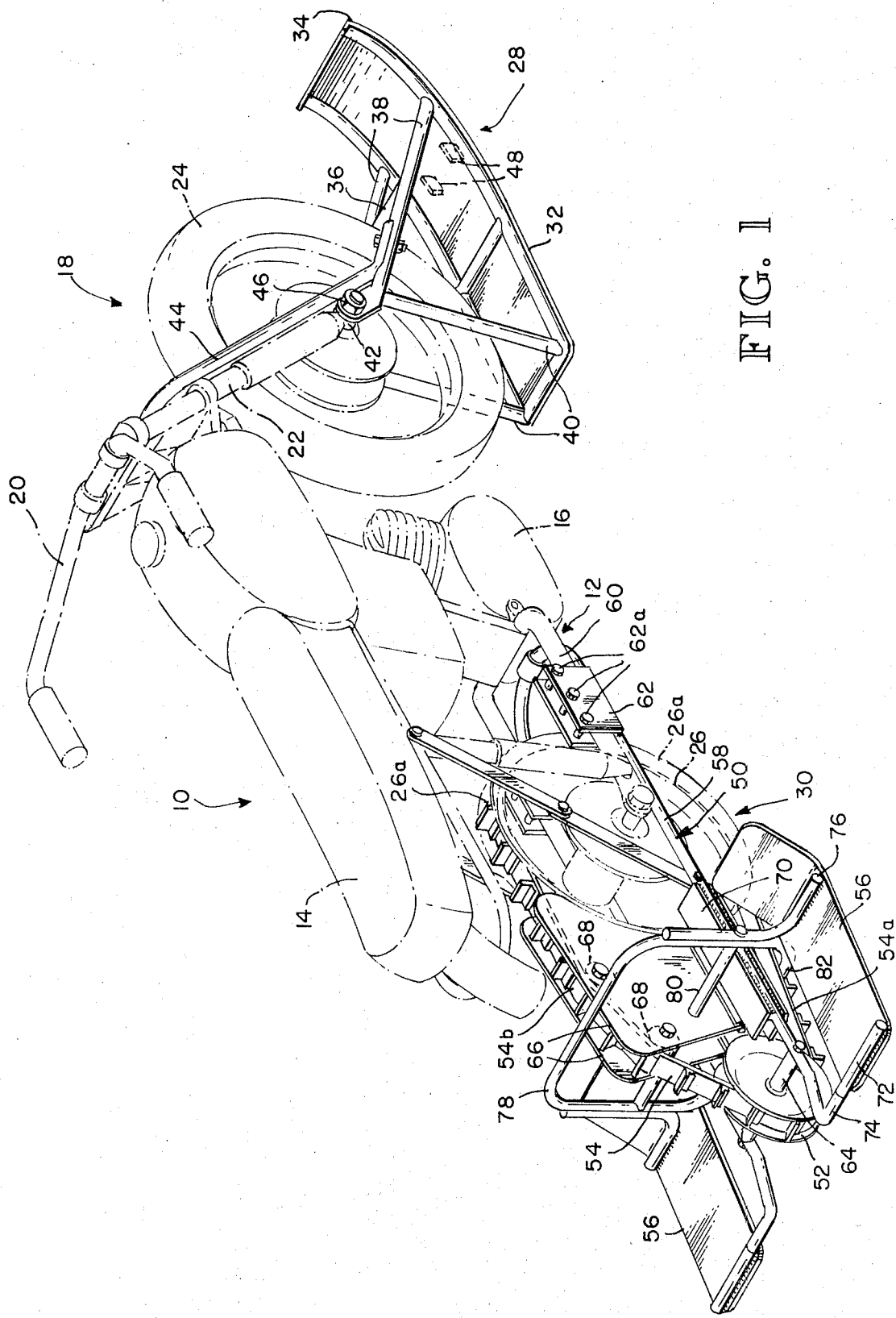
FIG. 1 is an isometric view illustrating the apparatus of the present invention mounted to a conventional motorcycle.

The apparatus of the present invention is adapted to be mounted to a conventional vehicle, such as a motorcycle, in a manner that the motorcycle can easily be converted to a snow traveling vehicle, and also be easily converted back to a conventional motorcycle. In FIG. 1, there is shown a conventional motorcycle 10, to which the apparatus of the present invention has been mounted. This motorcycle 10 comprises a main support frame 12, to which is mounted a driver seat 14 and an engine 16. Mounted to the forward end of the frame 12 is a steerable front wheel assembly, generally designated 18 and comprising handle bars 20, and a steering fork 22 to which is mounted the front wheel 24. Also mounted to the frame 12 is a rear drive wheel, the rim of which is shown at 26, and which is powered from the engine 16. As will be disclosed more fully below, the rear tire is removed from its rim 26 for conversion of the motorcycle 10 to a snow traveling vehicle.

The components 12 through 26 which have been described thus far are prior art components generally found in present day motorcycles. The apparatus of the present invention by which the motorcycle 10 can be adapted for snow travel comprises: (a) a forward support and steering ski unit 28, and (b) a rear support and drive assembly 30.

The ski assembly 28 comprises a lower ski member 32 positioned below and aligned with the front wheel 24, and having an upturned forward end 34 extending forwardly of the wheel 24. Connected to and extending upwardly from the ski 32 is a triangular mounting frame 36, comprising right and left forward struts 38 and right and left rear struts 40, which join to one another at the axel 42 of the front wheel 24. There is a U-shaped positioning arm 44 rigidly connected to the two front struts 38 at the upper ends thereof and reaching upwardly and over the front wheel 24. This arm member 44 bears against the upper forward portion of the steering fork 22 to prevent forward and upward rotation of the front end 34 of the ski 32.

The forward ski assembly is conveniently mounted to the front wheel assembly 18 by removing the lock nuts 46 which are threaded onto the axel 42 and normally hold the front wheel 24 in place. The upper ends of the two sides of the frame 36 is to be inserted onto the axle 42, after which the lock nuts 46 are replaced. With the front ski assembly 28 so mounted to the axle 42, the ski 32 is permitted some degree of rotation about the horizontal lateral axis of the axle 42, with the forward rotation of the ski 32 beyond a desired operating location being limited by the arm 44. With the ski 32 being so mounted to the steering assembly 18, the ski 32 can be turned to the right or left by turning of the handlebars 20 to steer the vehicle 10 through snow. To enhance the steering capability of the ski 32, downwardly extending fins can be provided, such as those shown at 48.

The rear support and drive assembly 30 comprises generally an auxiliary frame 50, a rear idler wheel 52, an endless belt 54 and a pair of optional outrigger skis 56. In general, the auxiliary frame 50 provides support for the rear idler wheel 52, the outrigger skis 56 and the belt 54. The belt 54 is mounted around both the front drive wheel rim 26 and the idler wheel 52 to provide a lower snow engaging drive run 54a of the belt 54 to cause forward movement of the vehicle 10 through the snow.

To describe the rear drive assembly 30 more particularly, the frame 50 comprises a pair of right and left horizontal bars 58 mounted on opposite sides of the rear drive wheel 26 and rigidly connected to an existing U-shaped bar 60 which makes up a lower portion of the aforementioned existing motorcycle main frame 50. The forward ends of the two bars 58 are positioned adjacent to related portions of the main frame bar 60 and are rigidly interconnected thereto, each by a related U-shaped bracket 62. The two bars 58 extend rearwardly from the main frame 60 in cantilever fashion to the rear end of the drive assembly 30. The aforementioned idler wheel 52 is mounted by means of an axle 64 between the rear portions of the two bars 58.

Mounted between the two auxiliary frame side bars 58 just forward of the rear idler wheel 52 is a guide frame made up of two longitudinally aligned upstanding guide plates 66, laterally spaced from each other a moderate distance to accomodate the upper return run 54b of the aforementioned belt 54. A pair of idler wheels 68 are provided at the upper portion of the guide plate 66 to provide proper tension for the belt 54. The two guide plates 66 are welded or otherwise secured to the side bars 58 through related mounting plates 70.

Each of the aforementioned rear outrigger skis 56 is mounted to the auxiliary frame 50 by means of an attached rear lateral tubular finger 72 which interfits with a related socket member 74 extending laterally outwardly from the rear end of a related one of the side bars 58. Fixedly attached to the forward end of each of the skis 56 is a related right angle arm member 76 which bolts to a transversely aligned upright rectangular frame 78 that is fixedly attached to the auxiliary frame 50. The arm member 76 has a plurality of through holes 77 by means of which the height of the forward end of the related outrigger ski 56 can be adjusted. The frame 78 has upper and lower bars 80 and 82 which attach to, respectively, the guide frames 68 and the lower mounting plates 70.

The belt 54 is made out of a strong yet flexible material such as rubber, and is formed with transverse grooves 84 along its interior surface for better frictional engagement of the rim 26 of the drive wheel. At regularly spaced locations along the outer surface of the belt 54, there is a plurality of transversely aligned cleats 86 secured to the belt 54 by means of bolts 88. As mentioned above, in mounting the apparatus of the present invention to the motorcycle 10, the rear tire is removed from the rim 26, with the rim 26 thus providing a circumferential groove to accomodate the belt 54 and keep it in proper engagement with the drive wheel 26. Thus, the forward end of the belt 54 tracks in the forward portion of the groove 26a of the drive wheel rim 26, the rear portion of the belt 54 tracks in the circumferential groove of the idler wheel 52, and the upper return run 54b of the belt 54 is positioned between the guide plate 66 and travels over the two tensioning idler rollers 68.

As mentioned above, the apparatus of the present invention particularly lends itself for use as a conversion kit or assembly, by which the conventional motorcycle 10 can be readily converted to a snow traveling vehicle. The front steerable ski assembly 28 is easily mounted by removing the two front axle lock nuts 46, inserting the frame 36 onto the axle 42, and threading the nuts 46 back into place. To mount the rear drive assembly 30 to the motorcycle 10, first the rear tire (not shown) mounted to the rear wheel rim 26 is removed in a conventional manner. Next, the drive assembly is attached as a unit to the main frame 12, with the drive belt 54 being mounted around the forward peripheral portion of drive wheel rim 26. This can be accomplished either by looping the belt 54 around the wheel rim 26 when the rear wheel is dismounted for removal of the tire ordinarly mounted thereon, or the belt 54 can be provided with a loop connection which can be disengaged and then brought back into secure engagment after the belt is mounted to both the wheels 26 and 52. The bolts 62a of the mounting brackets 62 are kept slightly loose until the belt 54 is in place. Then the auxiliary frame 50 is moved rearwardly with respect to the frame 60 until there is proper tension on the belt 54, after which the bolts 62a are tightened to hold the frame 50 securely in place.

In operation, the engine 60 drives the rear wheel rim 26 which in turn powers the drive belt 54. The cleats 86 of the belt 54 passing along the lower run 54a engage the underlying snow to push the vehicle 10 forwardly. The forward ski 32, provides forward support and in addition enables the vehicle to be steered by manipulation of the handlebars 20. The rear outrigger skis 56 are for use primarily in deep soft snow. These skis 56 are positioned moderately above the level of the lower drive belt run 54a (e.g., 4 to 6 inches) so that the skis 56 are able to provide support from the snow surface, while permitting the belt 54 to have sufficient traction in the snow. The forward ends of the skis 56 are vertically adjustable by means of the proper selection of the mounting hole 77. Alternately, in shallower snow or in hard packed snow, the outrigger skis 56 can be removed, with the entire rear support being on the belt 54, which in turn transmits the load into the rear wheel 26.

With the auxiliary frame 30 being cantilevered from the main frame 12, the two main bars 58, having some resiliency therein, permit moderate up and down movement of the frame 50 to cushion small impacts on the rear portion of the power assembly 30. Also, with the forward ski assembly 28 being pivotally mounted to the wheel axle 42, the position of the ski 32 is able to adjust to the contour of the surface over which it is traveling.

What is claimed is:

1. In combination with a ground traveling vehicle, such as a motorcycle, having a main supporting frame, a steerable front wheel assembly mounted to the frame, and a rear drive wheel which is mounted to the main frame and comprises a wheel rim having a circumferential groove adapted to carry a tire therein.

an apparatus used in combination with said vehicle for easy conversion of the vehicle for travel over a snow surface, and easy reconversion back to the conventional vehicle arrangement for ground travel, said apparatus comprising:
  a. a front ski unit adapted to be mounted to said front wheel assembly so as to be steerably therewith and provide front end support for the vehicle,
  b. a rear support and drive assembly comprising:
    1. an auxiliary frame mounted to said main frame and extending rearwardly therefrom,
    2. a rear idler wheel rotatably mounted to a rear portion of the auxiliary frame at a level proximate said snow surface and rearwardly of said drive wheel, and
    3. an endless snow engaging belt mounted around and in the circumferential groove of the rim of said drive wheel and on said idler wheel so as to be powered directly from said drive wheel, said belt having a lower drive run portion positioned to engage said snow surface.

2. The apparatus as recited in claim 1, wherein there is connecting means rigidly connecting a forward end of said auxiliary frame to said main supporting frame, whereby said auxiliary frame is cantilevered rearwardly from said main frame and maintains substantially the same relative position therewith.

3. The apparatus as recited in claim 2, said connecting means is a longitudinally adjustable connection, whereby said auxiliary frame can be positioned longitudinally for proper tension of said snow engaging belt.

4. The apparatus as recited in claim 2, further comprising a pair of outrigger skis mounted on opposite sides of said auxiliary frame at the rear end thereof, said outrigger skis being positioned at a level moderately above the level of the lower drive run portion of the snow engaging belt and rearwardly of said rear drive wheel.

5. The apparatus as recited in claim 1, wherein said front ski unit comprises a ski and an upstanding frame by which said ski is mounted to an axle of a front wheel of the front wheel assembly, thereby permitting limited rotational movement of said front ski, said ski unit further comprising an upstanding positioning arm extending upwardly from said front wheel axle to limit forward movement of said ski unit with respect to said front wheel assembly.

6. In combination with a ground traveling vehicle, such as a motorcycle, having a main supporting frame, and a rear drive wheel which is mounted to the main frame and comprises a wheel rim having a circumferential groove adapted to carry a tire therein, an apparatus used in combination with said vehicle for easy conversion of the vehicle for travel over a snow surface, and easy reconversion back to the conventional vehicle arrangement for ground travel, said apparatus comprising:
  a. an auxiliary frame adapted to be mounted to said main frame and extending rearwardly therefrom,
  b. a rear idler wheel rotatably mounted to a rear portion of the auxiliary frame at a level proximate said snow surface and rearwardly of said drive wheel, and
  c. an endless snow engaging belt adapted to be mounted in the circumferential groove of the rim of said drive wheel and on said idler wheel so as to be powered directly from said drive wheel, said belt having a lower drive run portion positioned to engage the snow surface.

7. The apparatus as recited in claim 6, wherein there is connecting means rigidly connecting a forward end of said auxiliary frame to said main supporting frame, whereby said auxiliary frame is cantilevered rearwardly from said main frame and maintains substantially the same relative position therewith.

8. The apparatus as recited in claim 7, wherein said connecting means is a longitudinally adjustable connection, whereby said auxiliary frame can be properly positioned for proper tension of said snow engaging belt.

9. The apparatus as recited in claim 7, further comprising a pair of outrigger skis mounted on opposite sides of said auxiliary frame at the rear end thereof, said outrigger skis being positioned at a level moderately above the level of the lower drive run portion of the snow engaging belt and rearwardly of said drive wheel.

10. In combination with a ground traveling vehicle, such as a motorcycle, having a main supporting frame, a steerable front wheel assembly mounted to the frame, and a rear drive wheel which is mounted to the main frame and comprises a wheel rim adapted to carry a tire thereon, an apparatus used in combination with said vehicle for easy conversion of the vehicle for travel over a snow surface, and easy reconversion back to the conventional vehicle arrangement for ground travel, said apparatus comprising:
  a. a front ski unit adapted to be mounted to said front wheel assembly so as to be steerable therewith and provide front end support for the vehicle,
  b. a rear support and drive assembly comprising:
    1. an auxiliary frame mounted to said main frame and extending rearwardly therefrom,
    2. a rear idler wheel rotatably mounted to a rear portion of the auxiliary frame at a level proximate said snow surface and rearwardly of said drive wheel,
    3. an endless snow engaging belt mounted around and in the rim of said drive wheel and on said idler wheel so as to be powered directly from said drive wheel, said belt having a lower drive run portion positioned to engage said snow surface, and
    4. said auxiliary frame further comprising a pair of vertical guide members, having tension rollers mounted thereon, said snow engaging belt having a return run passing between said guide members and over said tensioning rollers.

11. In combination with a ground traveling vehicle, such as a motorcycle, having a main supporting frame, a steerable front wheel assembly mounted to the frame, and a rear drive wheel which is mounted to the main frame and comprises a wheel rim adapted to carry a tire thereon, an apparatus used in combination with said vehicle for easy conversion of the vehicle for travel over a snow surface, and easy reconversion back to the conventional vehicle arrangement for groung travel, said apparatus comprising:
  a. a front ski unit adapted to be mounted to said front wheel assembly so as to be steerable therewith and provide front end support for the vehicle,
  b. a rear support and drive assembly comprising:
    1. an auxiliary frame mounted to said main frame and extending rearwardly therefrom,
    2. a rear idler wheel rotatably mounted to a rear portion of the auxiliary frame at a level proximate said snow surface and rearwardly of said drive wheel,
    3. an endless snow engaging belt mounted around and in the rim of said drive wheel and on said idler wheel so as to be powered directly from said drive wheel, said belt having a lower drive run portion positioned to engage said snow surface, and
    4. a pair of outrigger skis mounted on opposite sides of said auxiliary frame, said outrigger skis being positioned at a level moderately above the level of the lower drive run portion of the snow engaging belt, each of said outrigger skis having a rear connection to said auxiliary frame, and a vertically adjustable forward connection to said auxiliary frame, whereby drive traction of said belt can be varied by vertically adjusting said outrigger skis.

12. In combination with a ground traveling vehicle, such as a motorcycle, having a main supporting frame, and a rear drive wheel which is mounted to the main frame and comprises a wheel rim adapted to caryy a tire thereon, an apparatus used in combination with said vehicle for easy conversion of the vehicle for travel over a snow surface, and easy reconversion back to the conventional vehicle arrangement for ground travel, said apparatus comprising:
  a. an auxiliary frame adapted to be mounted to said main frame and extending rearwardly therefrom,
  b. a rear idler wheel rotatably mounted to a rear portion of the auxiliary frame at a level proximate said snow surface and rearwardly of said drive wheel,
  c. an endless snow engaging belt adapted to be mounted in the rim of said drive wheel and on said idler wheel so as to be powered directly from said drive wheel, said belt having a lower drive run portion positioned to engage the snow surface, and
  d. said auxiliary frame further comprising a pair of vertical guide members having tension rollers mounted thereon, said snow engaging belt having a return run passing between said guide members and over said tensioning rollers.

13. In combination with a ground traveling vehicle, such as a motorcycle, having a main supporting frame, and a rear drive wheel which is mounted to the main frame and comprises a wheel rim adapted to carry a tire thereon, an apparatus used in combination with said vehicle for easy conversion of the vehicle for travel over a snow surface, and easy reconversion back to the conventional vehicle arrangement for ground travel, said apparatus comprising:
  a. an auxiliary frame adapted to be mounted to said main frame and extending rearwardly therefrom,
  b. a rear idler wheel rotatably mounted to a rear portion of the auxiliary frame at a level proximate said snow surface and rearwardly of said drive wheel,
  c. an endless snow engaging belt adapted to be mounted in the rim of said drive wheel and on said idler wheel so as to be powered directly from said drive wheel, said belt having a lower drive run portion positioned to engage the snow surface, and
  d. a pair of outrigger skis mounted on opposite sides of said auxiliary frame, said outrigger skis being positioned at a level moderately above the level of the lower drive run portion of the snow engaging belt, each of said outrigger skis having a rear connection to said auxiliary frame, and a vertically adjustable forward connection to said auxiliary frame, whereby the drive traction of said belt can be varied by vertically adjusting said outrigger skis.

* * * * *